Patented Oct. 4, 1949

2,483,739

UNITED STATES PATENT OFFICE 2,483,739

ETHERIFICATION PROCESS

John Robert Roach and Harold Wittcoff, Minneapolis, Minn., assignors to General Mills, Inc., a corporation of Delaware No Drawing. Application January 4, 1946, Serial No. 639,158

7 Claims. (Cl. 260—615)

The present invention relates to a process of preparing ethers of polyhydric alcohols, particularly ethers of polyhydric alcohols which are produced by the condensation of formaldehyde with compounds containing activating groups which permit the formation of methylol groups.

The condensation between formaldehyde and compounds containing activating groups such as carbonyl groups or nitro groups which permit the formation of methylol groups, are commonly conducted in the presence of an alkaline catalyst such as calcium hydroxide, sodium hydroxide, potassium hydroxide, and the like. These compounds are generally isolated by a rather tedious procedure which contributes markedly to the cost of the product. This procedure may involve precipitation of the catalyst, evaporation of the solution, and crystallization of the product. Sometimes great difficulty is encountered in obtaining an ash-free product.

It has now been discovered that the crude reaction mixture containing the polyhydric alcohol may be used as such for etherification without any attempt to isolate the product, or even to remove the catalyst or any other materials such as calcium formate which is sometimes formed during the condensation. Etherification is frequently conducted in an alkaline medium and it has been found that the alkaline catalyst remaining in the reaction mixture from the formaldehyde condensation contributes to the alkalinity necessary during the etherification process. Thus it has been found that the alkaline catalyst instead of being a disadvantage, actually contributes to the subsequent etherification reaction.

It is therefore an object of the present invention to provide an advantageous procedure for the etherification of polyhydric alcohols obtained by the alkaline condensation of formaldehyde with a compound containing activating groups which permit the formation of methylol groups.

It is a further object of the invention to provide a novel process of etherifying such polyhydric alcohols in which the crude reaction mixture containing the polyhydric alcohol is employed.

These and other objects of the invention will be more fully apparent from the following description of the invention. In general, the process is applicable to the polyhydric alcohols which are produced by the alkaline condensation of formaldehyde with compounds containing activating groups such as carbonyl or nitro groups. Compounds containing suitable activating groups include acetaldehyde, acetone, methyl ethyl ketone, levulinic acid, cyclohexanone, cyclopentanone, nitromethane, and the like. Polyhydric alcohols obtained from such compounds include pentaerythritol, 2,2,6,6 - tetrahydroxymethylcyclohexanol, 2,2,6,6,-tetrahydroxymethylpyranol-1, 2,2,6 - trihydroxymethyl - 6 - methylpyranol-1, and trishydroxymethylnitro methane. The invention is applicable to the formation of practically any type of ether such as alkyl or substituted alkyl ethers, as for example, methyl, ethyl, propyl, butyl, hydroxyethyl, hydroxypropyl, etc., or to an aralkyl type of ether such as benzyl and the like. It is particularly applicable, however, to the formation of unsaturated ethers such as vinyl, allyl, crotyl, methallyl, ethylallyl, cinnamyl, crotyl, chloroallyl, chlorocrotyl, propargyl, methylvinylcarbinyl, tiglyl, isopropenylvinylcarbinyl, divinylcarbinyl, 2,4-hexadiene-1-yl, 2-methyl-2-hexene-1-yl, and 1-butene-4-yl.

The etherification process is preferably carried out as follows. The crude reaction mixture of the formaldehyde condensation is usually obtained as an aqueous solution. The etherification with unsaturated type halides is preferably carried out in the presence of aqueous alkali of 50% or higher concentration. In order to concentrate the alkali, part of the water may be removed by evaporation or otherwise. Solid alkali, such as sodium hydroxide or a concentrated solution thereof such as a 70% solution, may then be added until the reaction mixture contains the desired alkalinity. In the case of etherification with saturated or less readily hydrolyzable etherification reagents a lower concentration of alkali may be used. This mixture may then be heated with stirring to 70–110° C., although lower or higher temperatures may be used under certain conditions. The heated reaction mixture is then treated with the etherifying agent, which may be added at the start of the reaction or over a period of several hours. When the reagents have been brought together the reaction mixture may advantageously be heated at the desired temperature with stirring for 1–7 hours. The order in which the reactants are mixed may be reversed with satisfactory results. Thus the crude reaction mixture may be mixed with a halide after which a concentrated solution of alkali may be added slowly with stirring.

In general, these etherification mixtures are heterogeneous and accordingly, efficient stirring means which promotes more intimate contact between the phases, increases the speed of reaction. In some instances it is desirable to employ a suitable solvent in which the two phases are soluble, in order to promote the reaction.

When the etherification has been effected the product together with some admixed halide which is generally used in excess forms an upper layer in the reaction vessel. The lower layer may contain water, alkali, alkali metal and alkaline earth salts, and the catalyst used to effect the initial condensation. The two layers may be separated, and thus the catalyst used in the condensation reaction is removed easily and expediently and without expense.

Furthermore, it must be stressed that in the isolation of the polyhydric material, portions of it are necessarily lost in manipulation. This loss is eliminated by the procedure which has just been described, and indeed the yields obtained by the newly disclosed procedure are as good and in some cases even better than those obtained by the conventional and more expensive procedures.

In general, it is wise to use an excess of the halide and an even larger excess of alkali since such conditions tend to allow more complete etherification and at the same time tend to decrease the amount of hydrolysis of the etherifying agent. By this simple one-step etherification process, the degree of substitution in the polyhydric alcohol may be of the order of 75% which in the case of the unsaturated ethers produces products which are readily adaptable for polymerization purposes.

In the preparation of ethers in which the halide etherifying agent is somewhat unreactive or quite volatile other means of effecting the etherification may be used. Thus it may be necessary to employ more elevated temperatures, even an autoclave if necessary. In certain cases it may be advisable to employ indirect means of etherification. For example, vinyl ethers may be obtained by interacting the polyhydric alcohol in the crude state with acetylene in the presence of strong aqueous alkali. In this procedure the advantages of the present invention are also obtained.

The following examples will serve to illustrate the invention.

*Example 1*

A mixture of 72 parts by weight of methyl ethyl ketone and 195 parts of paraformaldehyde in 900 parts of water was treated slowly with 28 parts of calcium oxide. Of course, any form of formaldehyde such as an aqueous solution could have been used. The initial exothermic reaction was controlled, after which the reaction mixture was kept at 50–55° C. for two hours with stirring. The temperature and reaction time may be varied in either direction without deleterious effects. Thereafter, the reaction mixture was evaporated in vacuo to a total weight of 579 parts. This was composed of approximately 206 parts of mixed condensation products, 65 parts of calcium formate, and 308 parts of water.

To this reaction mixture was added slowly 308 parts of flaked sodium hydroxide. Thus the concentration of alkali was approximately 50%. This reaction mixture was heated to about 75° C. after which 847 parts of allyl bromide was added dropwise with stirring over a period of four hours. The reaction mixture was rather thick but readily stirrable. Thereafter, the reaction mixture was heated at 75° C. and stirred for six hours longer. The upper layer was then separated, and the lower layer was extracted several times with ether. The ether extract was combined with the organic layer which was dried over an appropriate drying material and desolvated to yield the product in a yield of 262 parts. The product was light yellow in color and could be used in this condition. A portion of it, however, was purified further by distillation in vacuo. The product distilled over a range of 97–182° C. at 3 mm., leaving a small amount of residue which was a fairly viscous fluid which likewise could be used in coating and similar compositions, since, it was soluble in acetone, alcohol, chloroform, and other organic solvents as well as in soybean and other oils. The distillate had an iodine number of 261.0 and a hydroxyl content of 4.7% whereas the undistilled material had an iodine number of 246.3 and a hydroxyl content of 4.2%.

*Example 2*

To a reaction mixture consisting of 44 parts of acetaldehyde, 135 parts of paraformaldehyde, and 800 parts of water was added slowly with stirring 28 parts of calcium oxide. The addition was effected slowly enough so that the reaction temperature did not rise above 55° C. The colorless solution was stirred for three hours without further heating, after which it was concentrated in vacuo to a total weight of 553 parts. Thus, roughly, it may be assumed that there was present 136 parts of condensation product, 65 parts of calcium formate, and 352 parts of water.

To this reaction mixture was slowly added 352 parts of flaked sodium hydroxide so that the concentration of alkali was of the order of 50%. As in the preceding example, this mixture was heated to 75° C. after which 968 parts of allyl bromide was added dropwise with stirring over a period of four and one-half hours. Thereafter the reaction mixture was maintained at 75° C. with stirring for a period of six hours. The product was isolated from the reaction mixture according to the procedure described in the preceding example to obtain 216 parts of material. Here again, the product which was light yellow in color could be used as such. A portion of it, however, was distilled in vacuo to obtain a water-white distillate together with a small amount of light yellow residue which was soluble in organic solvents and in various oils, and which could be used in coating compositions. The product distilled over a range of 105–225° C. at 2 mm., the bulk of it distilling at 118°–135° C. at 2 mm. The higher boiling material was undoubtedly the allyl ethers of pentaerythritol polymers such as dipentaerythritol. The undistilled material had an iodine number of 276.2 and an hydroxyl content of 5.5%. The lower boiling fraction had an iodine number of 293.0 and an hydroxyl content of 6.2%, whereas the higher boiling fraction had an iodine number of 249.6 and an hydroxyl content of 5.0%. The total distillate had an iodine number of 284.0 and hydroxyl content of 5.8%.

While various modifications of the invention have been described it will be apparent that the invention is not limited thereto but that other variations will be apparent to those skilled in the art and accordingly the invention is to be limited only by the appended claims.

We claim as our invention:

1. Process of etherifying a polyhydric alcohol produced by the alkaline condensation of formaldehyde with a compound containing an activating group selected from the group consisting of carbonyl groups and nitro groups, said compound having active hydrogen atoms adjacent the activating group which comprises treating the crude condensation reaction mixture containing the polyhydric alcohol with a halide etherifying agent in the presence of the alkaline catalyst employed in said condensation.

2. Process of etherifying a polyhydric alcohol produced by the alkaline condensation of formaldehyde with a compound containing an activating carbonyl group, said compound having active hydrogen atoms adjacent the carbonyl group which comprises treating the crude condensation reaction mixture containing the polyhydric alcohol with a halide etherifying agent in the presence of the alkaline catalyst employed in said condensation.

3. Process of etherifying a polyhydric alcohol produced by the alkaline condensation of formaldehyde with a compound containing an activating nitro group, said compound having active hydrogen atoms adjacent the nitro group which comprises treating the crude condensation reaction mixture containing the polyhydric alcohol with a halide etherifying agent in the presence of the alkaline catalyst employed in said condensation.

4. Process of etherifying a polyhydric alcohol produced by the alkaline condensation of formaldehyde with a compound containing an activating carbonyl group, said compound containing active hydrogen atoms adjacent the carbonyl group which comprises removing water from the crude aqueous condensation reaction mixture adding alkali thereto to increase the concentration of the alkali in the aqueous reaction mixture to not less than about 50% and etherifying the crude reaction mixture with a halide etherifying agent in the presence of the concentrated alkali.

5. Process of etherifying a polyhydric alcohol produced by the alkaline condensation of formaldehyde with a compound containing an activating carbonyl group, said compound containing active hydrogen atoms adjacent the carbonyl group which comprises removing water from the crude aqueous condensation reaction mixture, adding an aqueous alkali to the reaction mixture containing in excess of 50% alkali to said reaction mixture to bring the concentration of alkali in the reaction mixture to not less than about 50% and then etherifying the crude reaction mixture with a halide etherifying agent in the presence of the concentrated alkali.

6. Process of etherifying a polyhydric alcohol produced by the alkaline condensation of formaldehyde with a compound containing an activating carbonyl group, said compound containing active hydrogen atoms adjacent the carbonyl group which comprises etherifying the polyhydric alcohol in the crude condensation reaction mixture by means of a reactive unsaturated halide in the presence of aqueous alkali not substantially lower in concentration than about 50%.

7. Process of etherifying a polyhydric alcohol produced by the alkaline condensation of formaldehyde with a compound containing an activating carbonyl group, said compound having active hydrogen atoms adjacent the carbonyl group which comprises treating the crude condensation reaction mixture containing the polyhydric alcohol with an allyl halide in the presence of the alkaline catalyst employed in said condensation.

JOHN ROBERT ROACH.
HAROLD WITTCOFF.

REFERENCES CITED

The following references are of record in the file of this patent:

UNITED STATES PATENTS

| Number | Name | Date |
|---|---|---|
| 1,774,500 | Burke | Sept. 2, 1930 |
| 1,878,040 | Voss | Sept. 20, 1932 |
| 1,936,093 | Lawson | Nov. 21, 1933 |
| 2,139,120 | Hass et al. | Dec. 6, 1938 |
| 2,170,624 | Wyler | Aug. 22, 1939 |
| 2,303,370 | Kugler et al. | Dec. 1, 1942 |
| 2,395,414 | Lincoln et al. | Feb. 26, 1946 |